United States Patent [19]

Seifert et al.

[11] Patent Number: 5,382,327
[45] Date of Patent: Jan. 17, 1995

[54] APPARATUS FOR THICKENING PULP AND PAPER STOCK

[75] Inventors: Peter Seifert; David E. Chupka, both of Middletown, Ohio

[73] Assignee: The Black Clawson Company, Middletown, Ohio

[21] Appl. No.: 649,232

[22] Filed: Jan. 29, 1991

Related U.S. Application Data

[63] Continuation of Ser. No. 264,118, Oct. 28, 1988, abandoned.

[51] Int. Cl.⁶ ............................................. B01D 33/04
[52] U.S. Cl. .................................... 162/317; 162/318; 210/401; 210/402
[58] Field of Search ................. 162/315, 316, 317, 318, 162/300, 357, 303, 55, 60; 210/401, 402, 407, 386, 318, 396, 391; 68/22 R, 45; 8/156

[56] References Cited

U.S. PATENT DOCUMENTS

| | | | |
|---|---|---|---|
| 1,241,905 | 10/1917 | Behr | 162/203 X |
| 3,616,660 | 11/1971 | Ingermarsson | 162/317 X |
| 4,101,374 | 7/1978 | Nebel et al. | 162/317 X |
| 4,430,159 | 2/1984 | Bubik et al. | 162/315 X |
| 4,501,040 | 2/1985 | Biondetti et al. | 8/156 |
| 4,501,662 | 2/1985 | Biondetti | 210/391 |
| 4,686,005 | 8/1987 | Biondetti et al. | 162/60 |
| 4,722,793 | 2/1988 | Seifert et al. | 210/401 |

Primary Examiner—Thi Dang
Attorney, Agent, or Firm—Biebel & French

[57] ABSTRACT

Embodiments of apparatus for thickening a liquid suspension of solid particles, such as papermaking pulp in water, include a pair of spaced apart rolls and a woven wire or plastic wire belt trained around these rolls. The suspension is supplied to the apparatus at the first roll for centrifugal extraction and is carried by the belt to the second roll for further water extraction and thickening, and is then discharged from the apparatus. In one embodiment, the first roll is formed with an open surface, and the suspension is delivered to the web at least partially by flowing through the first roll openings, from either a headbox in the on-running wedge zone or a headbox internal to the rolls to deliver stock outwardly through the roll. The apparatus may also include a second roll which is porous and has auxiliary water-removing appliances associated therewith, including blow boxes for forcing air either radially inwardly or radially outwardly of the second roll, and an auxiliary nip roll for creating a zone of higher compression for mechanical extraction of water from the mat of solid particles between the belt and the second roll. Rewetting of the mat caused by water entrained in the wire mesh cavities is reduced by the impingement of air jets to remove such water. In a further embodiment, one or both rolls may include a pair of disks spaced apart on a support shaft with the wire belt trained over the outer surfaces of the disks so that a substantial open extent of the belt is defined between the disks. The rolls may be mounted with the plane defined by their axes in any desired spatial orientation, from horizontal to vertical.

6 Claims, 9 Drawing Sheets

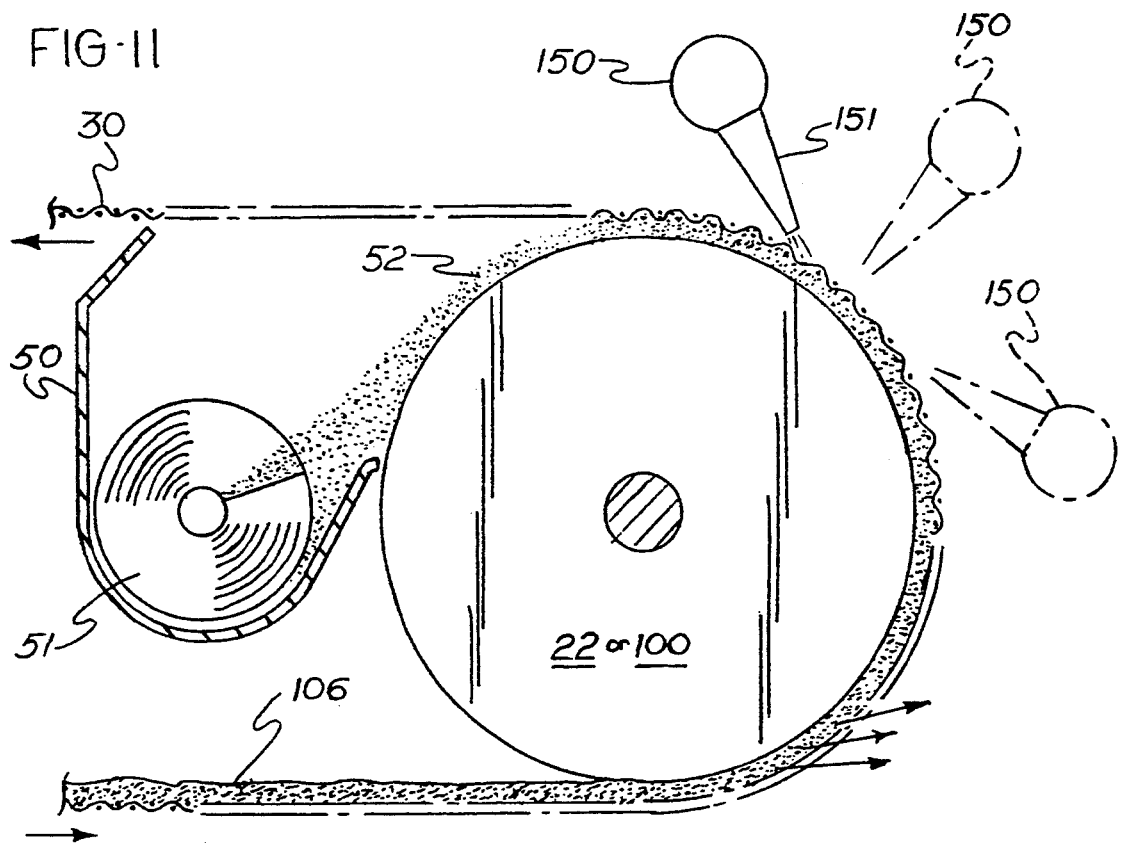
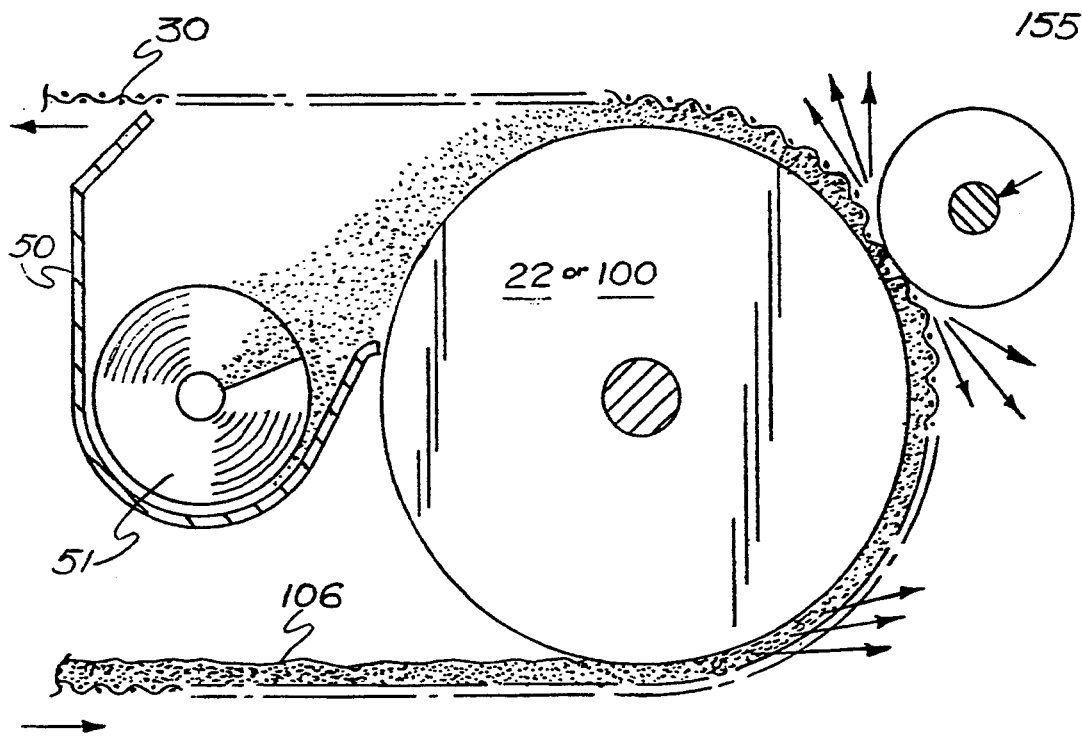

APPARATUS FOR THICKENING PULP AND PAPER STOCK

This is a continuation of Ser. No. 07/264,118 filed Oct. 28, 1988, now abandoned.

BACKGROUND OF THE INVENTION

The pulp and paper making industry has for many years made regular use of apparatus for thickening pulp and paper stock, usually for storage or other temporary purposes. The apparatus most commonly used in the prior art practice is known as a decker, and is relatively closely comparable in structure and mode of operation with a cylinder type paper machine, in that its main components are a wire-covered cylinder mold and a vat in which the cylinder mold rotates. In operation, the thickened pulp collects on the outer surface of the mold and is then dumped or couched therefrom for transport to a storage tank or other next station.

Deckers occupy considerable floor space, and are also relatively expensive, since the cylinder mold is a fairly complex piece of equipment, including as it does a structural framework for the filter wire. In addition, a decker is necessarily slow in operation, partly because the rotational speed of the cylinder mold must be kept below values at which centrifugal force would tend to cause the thickened pulp to be thrown off its surface, and the surface speed of cylinder molds is commonly in the range of only 200–250 feet per minute and has a practical maximum of 300 feet per minute. In general a decker is capable of thickening feed stock of 0.7 to 1.0% consistency to a range of 4 to 6%.

Among alternatives to deckers which have been offered to the industry in recent years, particularly as a pulp washer with thickening capabilities, is apparatus constructed in accordance with Biondetti et al, U.S. Pat. Nos. 4,501,040 and 4,686,005, wherein a continuous wire loop is supported by guide rolls in such manner that it wraps a portion of a solid cylinder mounted outside the wire loop. Dilute feed stock is delivered to the wedge zone defined by the portion of the wire approaching the cylinder and the adjacent surface of the cylinder, and this suspension is dewatered by expression of liquid through the wire into a receiver mounted inside the wire loop. According to those patents, feed stock at a consistency of less than 1.5%, preferably 0.4 to 0.8%, can be thickened to a consistency of 5 to 8%.

More recently, the assignee of this application has introduced to the industry a new apparatus for thickening pulp and paper stock which has the structural and operational characteristics disclosed in Seifert et al, U.S. Pat. No. 4,722,793. This apparatus comprises, as its major components, a pair of rolls rotatably mounted in spaced relation on parallel axes. An endless mesh-type wire belt is trained around these rolls in wrapping relation with a substantial portion of their surfaces so that the rolls and belt cooperate to define a space bounded by the rolls and the opposed runs of the wire between the rolls.

A headbox is mounted in this space and includes an outlet which delivers the pulp suspension to be thickened into the wedge zone defined by the portion of the wire approaching one roll and the adjacent portion of the roll surface, so that this pulp suspension is trapped between the wire and the roll. The rolls are driven at a sufficiently high speed to develop centrifugal force which causes liquid to be expressed from the stock layer between the wire and each roll, and a corresponding thickening of the pulp carried on the inner surface of the wire as it travels around each roll. Means are provided for collecting this thickened pulp from the second roll and removing it to one side of the apparatus.

The apparatus disclosed in the Seifert et al patent is capable of operating at very much higher speeds than conventional thickening apparatus of the decker type, namely speeds in the range of 1500–4000 feet per minute as compared with decker operation at a linear speed having a practical limit of 300 feet per minute. It is also capable of thickening feed stock from an input consistency of the order of 0.5% to more than 12%.

As a result of these capabilities, the capacity of such apparatus, in terms of tons per day of pulp, is correspondingly high. In addition, while the patent described both rolls as liquid-impervious, it also recommended that the first roll be provided with a grooved surface. It has been found in practice that this results in substantially increasing the capacity of the apparatus, by reason of the fact that with a grooved roll, substantially more pulp can be trapped between the wire and roll than when the first roll, to which the headbox delivers the stock, is smooth surfaced.

SUMMARY OF THE INVENTION

This application is directed to improvements in the apparatus of the above Seifert et al patent which further enhance efficiency and liquid removal. In accordance with one aspect of the present invention, it has been discovered that the capacity of thickening apparatus can be further increased, without loss in effectiveness, if the roll to which the feed stock is initially delivered, and which may therefore be identified as the breast roll, includes a discontinuous outer surface through which feed stock can enter and be discharged from a chamber within the roll. For example the discontinuous surface of the roll may be provided by a cylindrical shell having multiple openings therethrough. Such openings should have a greater flow area than the maximum size of particles in the feed stock to provide for a free flow of the stock in both directions through the shell. The chamber enclosed by the shell may be the entire interior of the roll.

Depending upon the particular construction of this roll, several forms of which are described hereinafter, the feed stock may be delivered directly to the chamber within the shell or may be delivered to the infeed wedge zone defined by the wire and shell in such manner that a substantial volume of stock enters the chamber through the openings in the shell. Whatever stock enters the roll is subsequently thrown by centrifugal force outwardly of the chamber and through the openings in the shell against the wire wrapping the shell. Much of the liquid component of that stock is therefore expressed through the wire, leaving a layer of thickened pulp on the inner surface of the wire loop. This layer is carried by the inside surface of the wire into wrapping relation with the second roll, where it is further dewatered and is then collected and removed, as described in the above Seifert et al patent.

A primary advantage of the use of a breast roll having a discontinuous surface is that it makes possible the delivery of a substantially higher volume of stock to the interior of the wire loop as it wraps the roll than with a liquid impervious roll, even when that roll is provided with a grooved surface. Necessarily, increasing the volume of low consistency stock which is subjected to dewatering around this roll correspondingly increases the amount of fiber deposited on the wire as the liquid component of the suspension is expressed through the wire by centrifugal force.

A further, independent part of the invention is to substitute in the apparatus of the Seifert et al patent, an "open" or liquid permeable surface or shell for the impervious shell of the second roll. In this case, the surface openings are smaller so as to pass liquid but not the pulp. For example, the roll could have a drilled shell which is covered by a wire mesh. Such a second roll could operate in conjunction with a first roll which is impervious, as disclosed in the Seifert et al patent or with a first roll which has a discontinuous or open surface, as disclosed herein.

The object of using an open roll in the second position is to obtain a higher discharge consistency of the thickened pulp. Higher consistency is achieved because the liquid which is squeezed from the fiber network as a result of the pressure induced by the wire tension can now travel either radially outward or radially inward, thereby reducing the required drainage pressure to achieve a certain consistency, or at a given drainage pressure, increasing the water removal quantity and therefore increasing discharge consistency.

In such a system, it is important that the liquid which migrates inwardly is removed from the inner surface of the shell by appropriate means; otherwise, the liquid would leave the shell and rewet the pulp, immediately after the pulp leaves the squeezing zone. For this purpose, an internal doctor, or a wet suction box, as commonly used in paper machine suction presses, may be arranged on the inside surface of the shell of the second roll to remove the water from the inner roll surface, collect it, and discharge it from the roll interior to the outside. Water discharge could be effected through a hollow shaft, through openings in the end of the second roll, or back through the open surface of this second roll. The latter discharge method could be accomplished after the point at which the pulp leaves the roll and before the wedge zone, where new wet pulp contacts the second roll. A suitable trough can catch such liquid.

The radially inward removal of water from the pulp layer at the second roll though the roll openings has particular advantage where the pulp mat or layer between the wire belt and the roll surface has a substantial drainage resistance. The drainage resistance may vary with the thickness of the mat and with the characteristic of the fibers and the pores therein. By providing a second path for water removal, the maximum distance which the water has to travel is halved, and the amount of water which has to travel in either direction is also halved, providing the possibility of a four-fold increase in water removal efficiency. In centrifugal water separation apparatus, the inflow of water against centrifugal force is enhanced where a minimum of water is permitted to accumulate at the radial inside surface, or where the water is removed from the inside surface about as soon as it arrives through the roll openings.

For these reasons, the supplemental water removal of the suction or vacuum box is enhanced where an upstream dam or diverter to the box scrapes away the water layer before it enters the box. On the other hand, where the drainage resistance of the pulp layer is low, either because of openness and/or thinness of the layer, water removal may be enhanced by applying a stream of air against the inside of the roll and through the roll openings, to entrain water for removal outwardly through the pulp layer.

Liquid migration can be enhanced by blowing air or other gas radially inwardly through the wire, the pulp layer, and the open roll shell. This can be accomplished by an external air blow box mounted in close proximity to the wire belt and fed by air under pressure. Some of the air can escape through the gap between the blow box and the belt, thereby purging water out of the mesh cavities of the wire into the filtrate space. The remainder can push liquid through the pulp mat into the interior of the roll, for removal by appropriate means described herein. Either alternatively or in addition, air can be used to assist centrifugal force to move liquid radially outwardly by means of an interior blow box and an exterior suction box adjacent the surface of the second roll.

Another improvement of the thickening apparatus recognizes the fact that the cavities in the mesh-type wire belt, at the end of the travel of the wire around the second roll, may be partially or completely filled with liquid, since the surface tension retards the centrifugal escape of this water. Furthermore, a thin layer of water remains on the outside surface of the belt or wire for the same reason. When the thickened pulp is separating from the wire, for eventual discharge, some or all of the liquid may be drawn out of the wire and follow the path of the pulp, virtually inseparable from it.

This effect is generally described as rewetting and occurs, for example, in paper machine press sections. Since the average weight per unit area of the fiber mat is quite low, the proportion of liquid drawn out of the wire cavities and remixed with the fiber mat is relatively large by weight, and the reduction of discharge consistency as a result of this effect is significant.

In order to prevent such rewetting, a jet or a stream of air is directed at the outer surface of the wire, just before the pulp separates from the wire, across the width of the machine. The air tends to blow the liquid out of the wire cavities into the filtrate space. When the point of separation of wire and pulp is reached, the wire cavities are now largely filled with air and rewetting is minimized. This arrangement of achieving higher discharge consistency is suitable for use in combination with an impervious or an open surface second roll. When an open surface roll is used as the second roll, it may be advantageous to blow the water out of the wire prior to the position where the inner suction box or the outer blow box are arranged.

Also, a nip roll may be applied to the thickening apparatus according to this invention. A nip roll may have a smooth cylindrical surface, or have a more open surface with circumferential, axial, or spiral, reverse, blind or through going holes, or it could be a wire mesh covered roll. The nip roll should be located in a zone at the second roll where the centrifugal water throw off is largely completed. If an air jet is used to blow water out of the wire, the nip roll is located before such a device. If the nip roll cooperates with an open second roll, it would be located at a point prior to drawing liquid radially inward. The nip roll acts to compress the fiber mat more than that the tension alone, so that more water is squeezed out of the mat.

After the squeezing zone, the pulp may follow either the wire or the roll surface, and it must be removed from either of these surfaces and put into the discharge conveyor. The surface of the open second roll however may not lend itself to doctoring, and in such a case, other means are necessary to lift the pulp mat off the roll surface. Means for this purpose include an internal blow box, or a brush roll mounted inside the roll, whose bristles penetrate through the openings and push the pulp away from the outer roll surface. An external stationary brush or rotating brush roll could be used. In cases where the pulp follows the wire, an air blow box, doctor, or similar means may be used to remove the pulp from the wire.

In some instances the openings in the second roll may be large, and include such a high percentage of the total surface area, that a mechanical squeezing effect is not achieved, and the second roll dewaters only by centrifugal action, similarly to the open first roll according to this invention. Such a design is suitable for pulps or suspended materials which dewater very easily, or in applications where high discharge consistency as achieved by additional squeezing action is not required. In this mode, the pulp travels, supported by the wire, around the second roll until the wire leaves this roll. The pulp must now be removed from the wire by appropriate means and guided into the discharge conveyor for discharge from the machine.

As an extension of the concept described in the preceding paragraph, either or both of the rolls may have an open surface provided by construction of the roll consisting of a shaft which carries a limited number of disks of a diameter equal to the roll diameter. At a minimum, two disks are arranged with one at each end of the roll, and the wire is supported and guided by these disks. As in other designs, centrifugal action of liquid and pulp, and the mass of the wire itself, create tension which keeps the wire adequately tensioned, even in those areas where the wire is not supported by a roll surface.

According to another extension of the invention, as described in detail hereinafter, the wire-supporting rolls may be mounted in spaced relation with their axes at different horizontal levels, and particularly with their axes in the same vertical plane so that one roll is spaced directly above the other, thereby reducing to a minimum the floor space required by the apparatus as a whole, or their axes may be tilted to any common plane including the vertical.

It is accordingly an important object of this invention to provide thickener apparatus having one or more of the features outlined above, and including such apparatus wherein one or both of the rolls supporting a continuous wire thereabout may be open faced or perforated.

A more particular object of the invention is the provision of a thickener outlined above, in which the first roll is open so that stock can enter the interior of the roll from a headbox and exit through the openings in the outer surface of the roll and the wire.

Another object of the invention is the provision of a stock thickener, of the kind outlined above, in which a second roll is perforated or is otherwise formed with openings therethrough so as to augment the radial inflow of water as the pulp or stock passes in compression between the wire and the outer surface of the roll.

Another object of the invention is the provision of a stock thickener in which auxiliary dewatering devices are employed in conjunction with one of the rolls, such as the second roll, including suction boxes, air jets and the like, to assist in the removal of water from the stock and/or to strip remaining fluid or water from the wire to prevent the same from rewetting the stock at the region of decompression.

A still further object of the invention is the provision of a thickener, including a pair of spaced-apart rolls mounted on parallel axes, which rolls are themselves substantially open, and which support a wire belt therebetween with opposed runs, and wherein the tension on the belt is maintained by centrifugal force of the stock applied to an inner surface of the belt and dewatering is accomplished substantially by the expelling of the water through the belt by centrifugal force.

Another object of the invention is the provision of a thickener, of the kind outlined above, including an auxiliary nip roll in association with the second dewatering roll and bearing against an outer surface of the wire for expressing water from the pulp between the wire and the second roll, which arrangement may, if desired, include a perforated or otherwise partially open second roll to permit ingress of water into the interior of the roll from the stock or pulp.

These and other objects and advantages of the invention, and the means by which they are carried out, will be pointed out in or apparent from the following description, the accompanying drawings and the appended claims.

BRIEF DESCRIPTION OF THE DRAWINGS

FIG. 11 is a view similar to FIG. 5, employing a solid or impervious second roll, combined with air impingement devices for directing air jets laterally onto the wire belt surface for to remove entrained liquid therefrom;

FIG. 12 is a view similar to FIG. 11, illustrating the employment of an auxiliary nip roll for liquid removal;

DESCRIPTION OF THE PREFERRED EMBODIMENT

Figure 1:
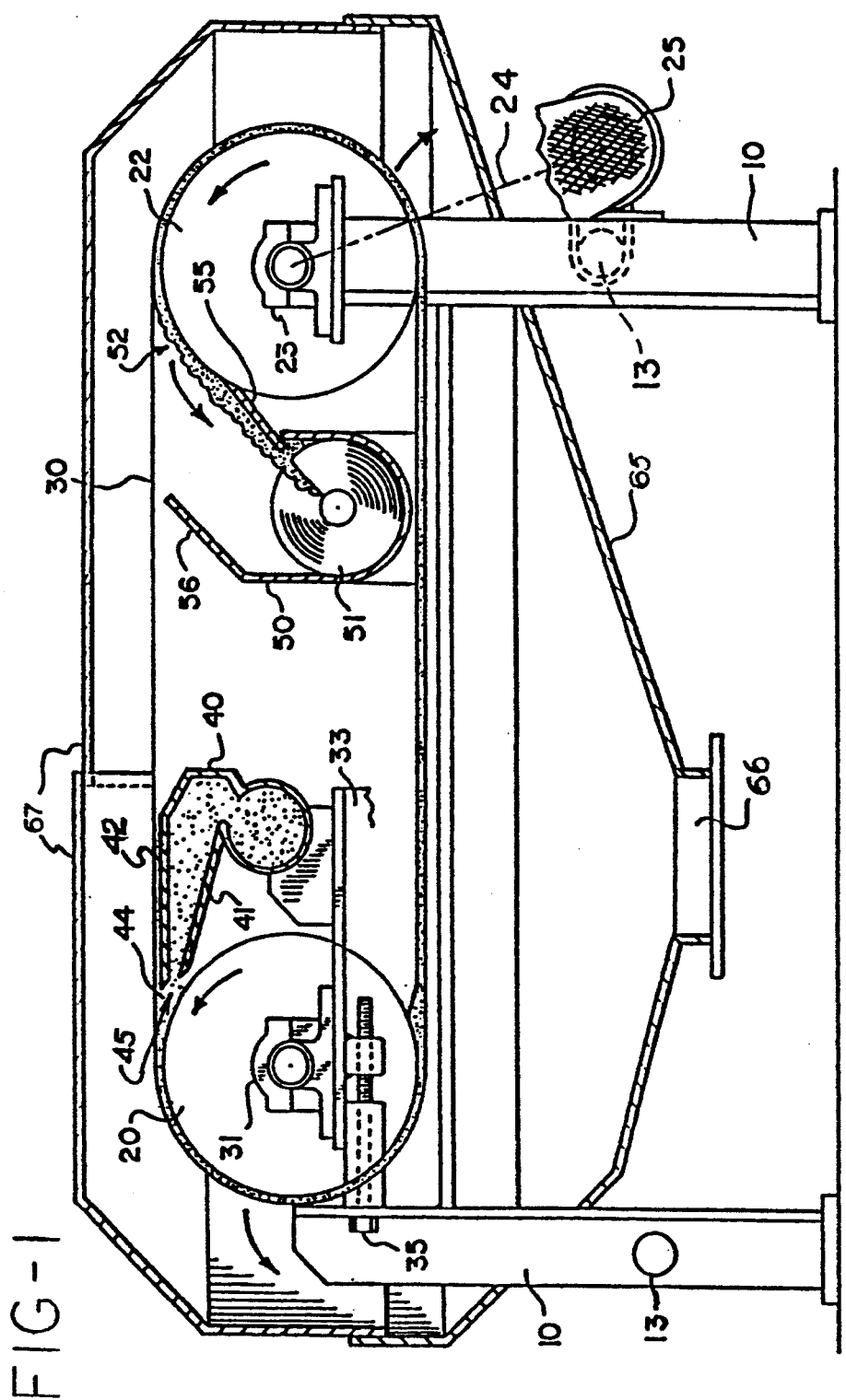
FIG. 1 is a somewhat diagrammatic side view, partly in section, of thickening apparatus in accordance with one embodiment of the invention wherein the roll to which the feed stock is delivered incorporates a perforate outer shell of honeycomb construction.

FIG. 1 illustrates the structure of the thickening apparatus disclosed in the above noted Seifert patent. It includes a frame comprising two columns 10 on each side connected by side beams 11 and suitable cross braces 13. The two rolls 20 and 22 form respectively the first and second rolls which are major operating elements of this apparatus and are mounted adjacent opposite ends of the frame. The roll 22 is shown as mounted by pillow block bearings 23 on the tops of columns 10. This roll 22 is driven, through the belt drive indicated generally at 24, by a motor 25 mounted on the cross brace 13 between the columns.

An endless belt or loop 30 of woven foraminous "wire" is trained around the rolls 20 and 22 and defines therewith a space in which the other operating parts of the apparatus are located. Preferably the wire 30 will consist of any plastic material currently used for paper machine wires, e.g. polyester. Also, since the product of the machine is pulp, rather than a sheet on which wire marking may be undesirable, the wire 30 may be of the pin seam type wherein the ends of the wire belt include overlapping loops which are releasably fastened together by a metal "pin" inserted through these loops. Use of pin seam wires is particularly desirable because it makes possible the changing of wires without the cantilevering of the rolls which is required if the wire is an endless loop without a seam.

Roll 20 has an adjustable mounting on the frame which includes means for tensioning the wire. Each of the journals of the roll 20 are mounted by a pillow block 31 on a base 33 which is in turn mounted for sliding movement on the side beam 10. Means such as a pair of jack screws 35 connected between bases 33 and the adjacent columns 10 cause and control this movement to effect corresponding control of the tension in wire 30.

The roll 20 functions similarly to the breast roll of a Fourdrinier paper machine in combination with a headbox 40 mounted on the same base members 33 as the roll 20 so that it maintains a fixed spacing with respect to roll 20. This headbox is shown as including lower and upper walls 41 and 42 which define a spout through which a relative flat jet 44 of feed stock is discharged into the wedge zone 45 defined by the upper run of wire 30 approaching roll 20 and the adjacent surface of the roll itself. The feed stock to be thickened is fed to the headbox by any convenient feed line (not shown) from the usual stock supply pump (not shown).

At the other end of the space defined by the upper and lower runs of the wire 30 and the rolls 20 and 22 is a trough 50 having a screw conveyor 51 mounted in the bottom thereof for receiving thickened pulp from the surface of roll 22 in the wedge zone 52 defined by the roll surface and the upper run of wire 30 leaving this roll. A doctor blade 55 bridges the space between the bare surface of roll 22 and the upstream wall 56 of trough 50 to transfer the thickened pulp from the surface of roll 22 to trough 50, and the screw 51 forces the accumulated pulp to a chute (not shown) at the back of the machine which leads to the next station in the system. Details of the structure and mode of operation of the preferred form of doctor blade 55 are disclosed in the commonly owned Bliss et al, application Ser. No. 229,673, filed Aug. 8, 1988.

Figure 2:
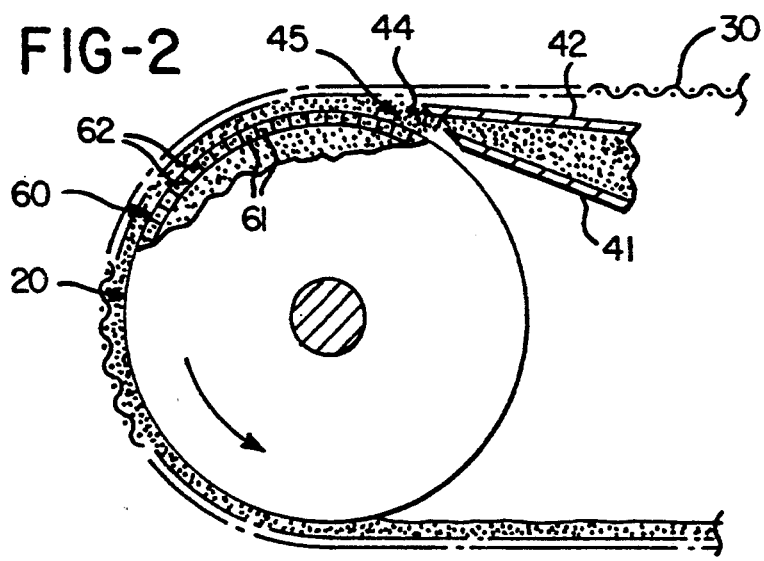
FIG. 2 is an enlarged fragment of FIG. 1 illustrating the course of the feed stock as it is delivered to the primary roll.

In accordance with one embodiment of the present invention, and as shown in FIG. 2, the roll 20, which is termed the "first" or the "primary" roll because it initially receives the feed stock, includes a cylindrical outer shell 60 having openings 61 therethrough which provide the roll with a discontinuous outer surface. The openings are of sufficiently large size to assure full flow therethrough of particles of the maximum size which may be suspended in the feed stock. For example, the shell 60 may be a perforated cylinder constructed as shown in Seifert et al, U.S. Pat. No. 4,106,980.

Alternatively, and as represented in FIG. 2, the shell 60 may be of a honeycomb structure such as is conventionally used in the manufacture of cylinder molds for the paper industry. Such honeycomb shells may be made of sheet metal strips of a width ranging from 0.5 to 1.0 inch which are arranged and configured to define interfitting rows of hexagonal openings 61 with each side wall 62 thereof in the order of 0.5 inch long. Where such a honeycomb shell would serve as a support for a wire covering when used in a cylinder mold, however, it is left bare for the purposes of the invention to form the open faced surface which is wrapped by the wire 30.

The requirement that the openings 61 be large enough to pass the largest solid particles in the stock, which may include relatively large pieces of reject material such as paper clips, is also desirable for another reason. This is that openings of such size cause the roll 20 to have an outer surface less smooth than the wire 30, and because a pulp or paper web has a natural tendency to transfer to the smoother surface, the layer of pulp accumulated between the wire and roll 20 will tend to deposit itself on the bottom run of the wire without requiring doctoring. This result could be further assured by the provision of the doctor in the vicinity of the five o'clock position on roll 20 as shown in the above U.S. Pat. No. 4,722,793, but generally no such doctor would be needed.

The internal construction of the roll 20 is not important to the invention, so long as the interior of the roll is not partitioned in such manner as to prevent free circulation of stock into and out of the roll through the shell openings 61. The ends of the roll are preferably closed by end heads so that fluid communication with its interior can be only through the openings 61. For example, roll 20 may be made in accordance with Seifert, U.S. Pat. No. 4,106,980 but with both ends closed, so that the interior of the .roll acts as a chamber enclosed by the shell 60 but providing for the in and out flow of feed stock through the openings 61.

In operation, and as illustrated in FIG. 2, the flat jet 44 of feed stock from the headbox outlet is directed into the wedge zone 45 and preferably at the apex of the zone where the wire and roll shell meet. Some of this stock impinges on the wire, and is immediately partially dewatered because the force of the jet cause liquid to travel through the wire. Some stock is received between the shell 60 and the wire, but since the shell is open faced, a substantial volume of stock enters the interior of the roll through the openings 61.

With the roll 20 rotating at a relatively high surface speed, such as 3000–4000 feet per minute, whatever stock enters the openings 61 within the shell 60 is immediately subjected to correspondingly high centrifugal force, since the walls 62 defining the openings 61 are traveling at essentially the same speed as the wire 30. This not only causes the stock in the openings 61 to travel at the same speed, but centrifugal force urges it back out and toward the wire covering the outer ends of those openings. Similarly, stock which passes entirely through the shell 60 into the interior of the roll is thrown by centrifugal force back into and through the shell openings 61 along the side of roll 20 opposite the headbox 40.

Since only the wire 30 then prevents free centrifugal discharge of the stock from the roll, the continuous application of centrifugal force causes the liquid component of the stock to be expressed through the wire while the pulp materials suspended therein are held by the wire and forms a layer on its inner surface. The liquid expressed in this manner through the wire, both in wrapping roll 20 and in subsequently wrapping the second roll 22, is collected in a trough 65 (FIG. 1) which extends under both of rolls 20 and 22 and is provided with a drain outlet 66. A hood 67 is mounted above the apparatus as a whole, and it fits into the top of the trough 65 so that any liquid hitting the inner surface of this hood will drip therefrom into the trough 65.

As is explained in the above U.S. Pat. No. 4,722,793, the primary action of the wire 30 is to serve as a filter medium that holds the fiber and other solid constituents of the stock on its inner surface against the action of centrifugal force, which is the major factor causing dewatering of the retained pulp. In order to provide for maximum capacity for retaining pulp, the wire need not be maintained under more than enough tension to transmit the drive from the roll 22 to the roll 20, particularly since the pressure between the wire and rolls is augmented by the layer of pulp which accumulates therebetween. As noted in the above patent, the tension may be in the range of 1 to 40 pounds per linear inch.

The initial dewatering takes place through the portions of the wire which successively wrap the roll 20. Generally, if the feed stock has a consistency of 0.5%, the pulp layer on the bottom run of the wire will be dewatered to a consistency in the range of 6 to 8%. Dewatering to higher consistencies is generally more difficult since the liquid in pulp of that consistency is no longer free. Nevertheless, under the operating conditions described above, a consistency in the range of 12 to 14% for the pulp removed from the roll 22 can be readily obtained. Whatever liquid enters the interior of the roll 20, which can be only through the perforations 61, leaves the roll through some of the same perforations. While it might be possible to flood the apparatus by supplying the feed stock at too great a volumetric feed rate, balancing of the supply rate with the capability of the apparatus to effect adequate dewatering would be no more than a simple matter of observation and control of the feed rate.

Figure 3:
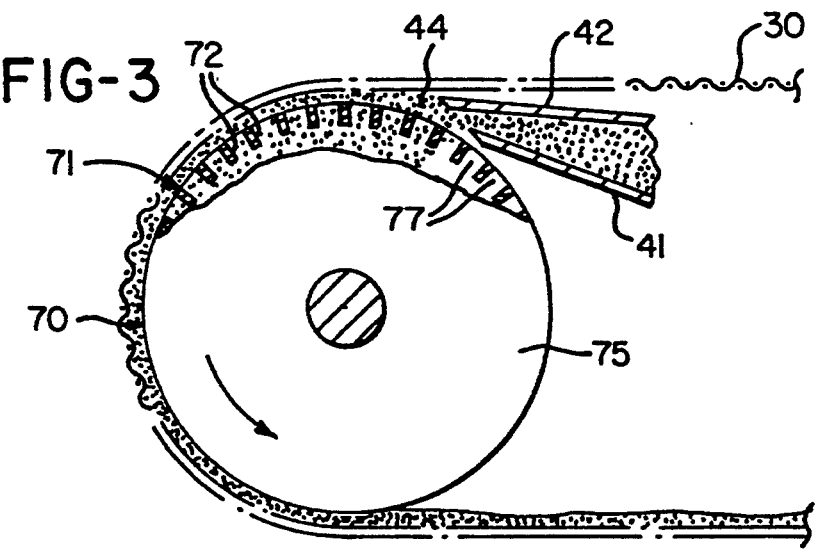
FIG. 3 is a somewhat diagrammatic sectional view illustrating another construction of perforate surfaced roll in the position of the primary roll in FIG. 1.

FIG. 3 is a view similar to FIG. 2 showing a different construction of the primary roll 70 which can be used in place of the roll 20. This includes a cylindrical shell 71 having a discontinuous outer surface defined by multiple relatively flat bars 72 supported at their opposite ends by heads 75 which are in turn mounted for rotation in the same manner as the roll 20. The bars 72 are arranged in circumferentially spaced relation to provide slot-like perforations 77 therebetween, and they may also be supported at positions intermediate their ends by suitable disk members, not shown. When the roll 70 is utilized in the position of roll 20 in FIG. 1, the operation is essentially as described in connection with FIGS. 1-2, with the slots 77 functioning like the openings 61, and with the flat bars 72 acting as paddles which force stock in the slots 77 to travel at the same speed as the wire and to be discharged outwardly from the shell.

Figure 4:
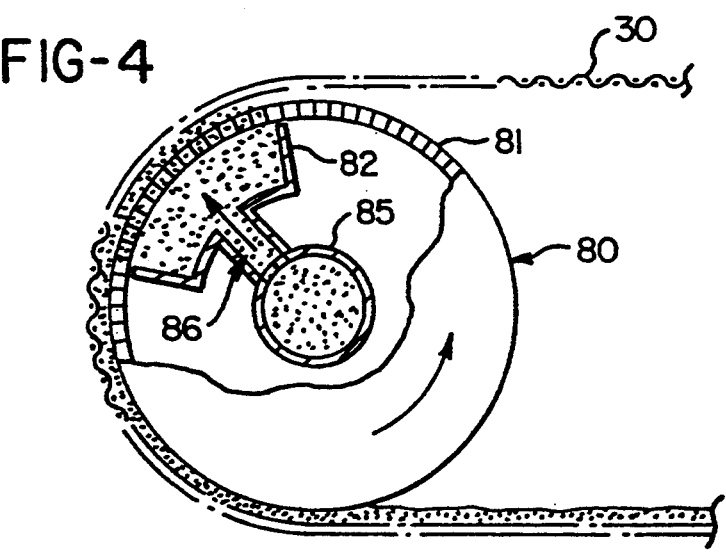
FIG. 4 is a view similar to FIG. 3 showing a perforate surfaced roll of a different construction.

In FIG. 4, the basic structure of the roll 80 may be the same as that of roll 20, but the system for supplying stock thereto is different. More specifically, the roll 80 is similar to a paper machine suction roll, or more accurately a blow roll, in that its perforate shell 81 encloses a stationary chamber 82, like the suction chamber in a suction roll, which underlies a substantial portion of the first 90° of roll shell 81 wrapped by the wire.

The roll 80 should preferably be rotatably mounted on a stationary hollow shaft 85 through which the feed stock is introduced to the interior of the roll and distributed to the interior of the box chamber 82, as indicated at 86, under sufficient pressure to cause an outward flow of stock through the perforate shell 81. This pressure should also be sufficient to force some of liquid component of the stock directly through the wire 30, and further dewatering will thereafter be caused by centrifugal force as the fiber layer building up on the inner surface of the wire continues its travel to the discharge position established by the doctor blade 55.

Figure 5:
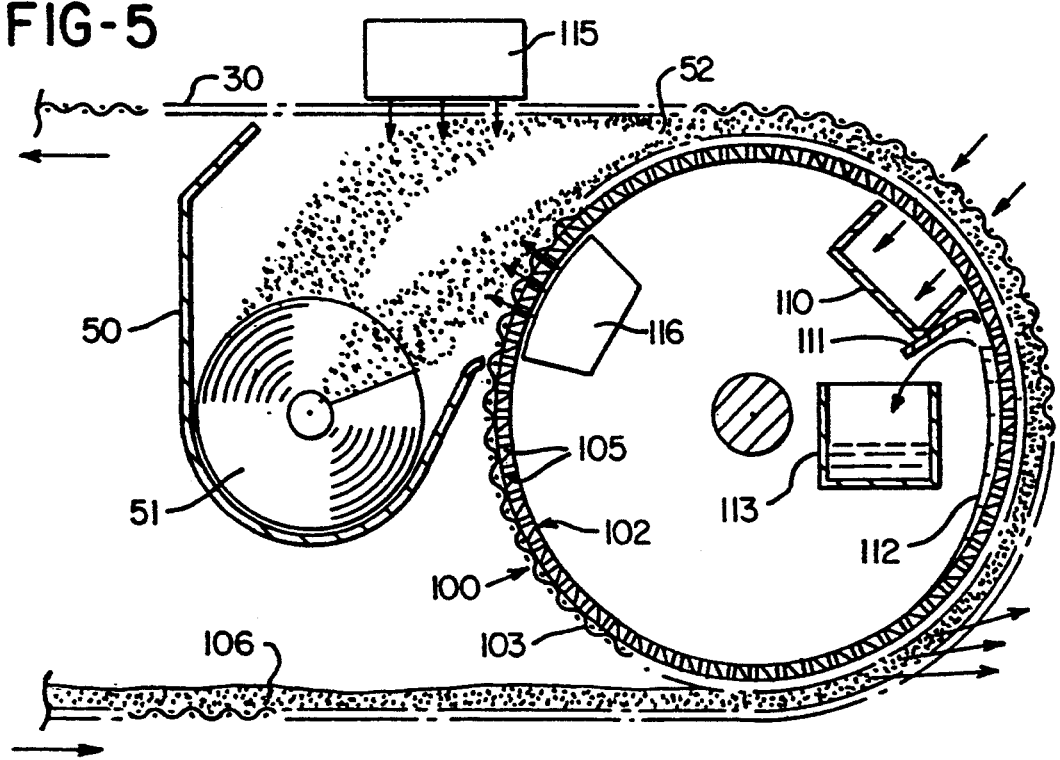
FIG. 5 is a somewhat diagrammatic sectional view through the second roll in which the roll is formed with an open surface and in which auxiliary dewatering devices are employed for removing liquid from the interior of the second roll.

An additional part of the invention is the employment of an open faced or liquid permeable roll for the second roll 22, and one preferred arrangement is shown by the roll 100 in FIG. 5, wherein the roll 100 is hollow and has an outer shell 102 which could be drilled, for example, and covered by a wire mesh 103. For maximum water removal, utilizing the squeezing pressure or force of the wire belt in tension, the openings 105 therein should be so small as to pass liquid but not pulp.

The advantages of the perforate roll 100 may be realized with either a solid or water permeable roll as the first roll 20. Higher consistency is achieved since the water, expressed from the pulp or stock layer 106, now has a second path for removal. As previously mentioned, the drainage pressure may be reduced, by providing a radially inward path in the zone or region of compression of the layer 106.

In the system as shown in FIG. 5, it is important to remove the free water which migrates inwardly to the inner surface of the shell, to hold the hydraulic pressure at a minimum, and to prevent rewetting of the pulp layer 106 when it leaves the pressure zone. For this purpose, an internal doctor in the form of a suction box 110 is arranged on the inside surface of the shell, preferably at a location therein more than half way around the pressure or squeeze zone but before the wedge zone 51 at the discharge or the off-running side of the belt 30. A wiper or doctor blade 111 at the upstream or leading side of the box 110 removes the film 112 of water from the inside surface of the shell 102, and discharges it into a removal trough 113. The water discharge may conveniently be routed through a hollow roll shaft (not shown).

FIG. 5 also illustrates a preferred arrangement for the removal of whatever portion of the fiber layer 106 may follow either the outer surface of the roll 100 or the inside surface of the belt, in the form of air pressure doctors or blow boxes. A blow box 115 positioned above the wire and wedge zone 52 will force pulp material entrained within the wire into the conveyor trough 50, and if required, a second blow box 116 may be positioned on the inside surface of the shell 102 at the wedge zone 52 to direct entrained stock material from the roll shell into the trough 50 and screw 51.

Figure 6:
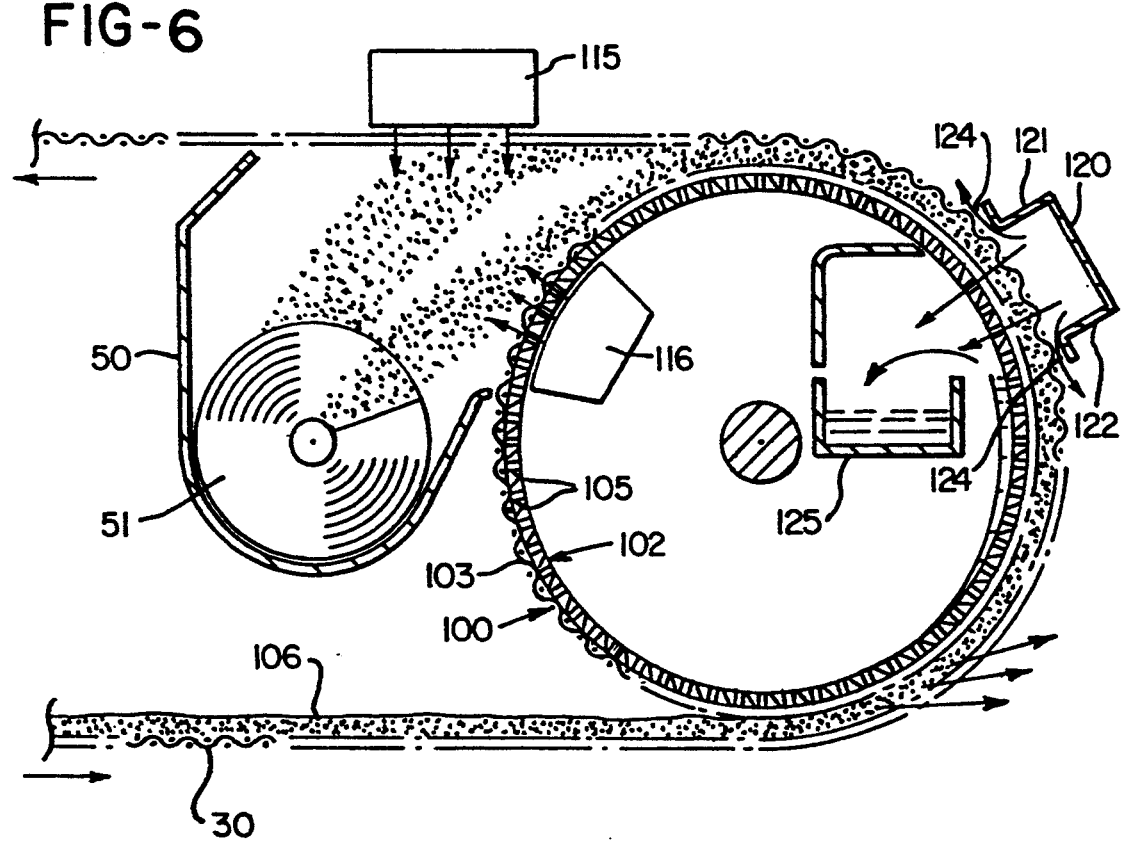
FIG. 6 is a sectional view similar to FIG. 5 and showing the employment of blow boxes to assist in liquid and pulp removal.

The arrangement of the open second roll 100 in FIG. 6 illustrates the advantageous use of an air jet or air pressure, to assist in water removal, in combination with the open shell 102. An air blow box 120 is mounted so as to direct a stream of air onto the outer surface of the wire belt, preferably at a location more than half way around the squeezing or pressure zone. The side walls 121 and 122 of the box 120 terminate in spaced relation to the outer surface of the wire, and define air outlet passages or slots 124 which enable some of the air to exit therethrough at high velocity tangent to the outer wire surface. These air streams, directed onto and closely adjacent the wire, entrain residual water out of the wire openings or cavities, and tend to purge these cavities of water by overcoming the surface tension tending to hold the water in place. The remaining air tends to assist in water removal by pushing water through the pulp layer 106 into the shell interior, for collection by a trough 125.

Figure 7:
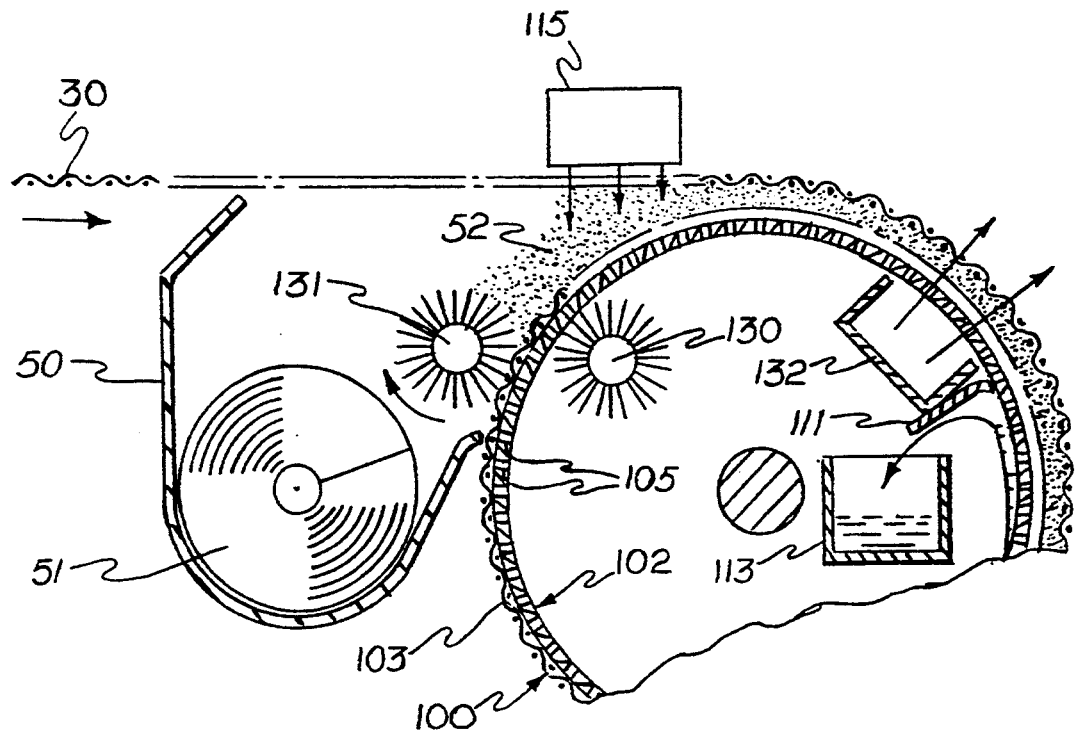
FIG. 7 is also a view of the second roll employing auxiliary mechanical apparatus in the form of a brush for removal of the stock fibers or mat from the roll surface.

In some instances, the surface of the second roll 100 may not lend itself to conventional doctoring, such as where the surface includes or is formed as a wire mesh 103, as shown in FIG. 7. An internal blow box 116 can be used, but alone may not be sufficient. In such cases, a brush 130 can be mounted on the inside of the shell 102 and arranged so that the bristles penetrate though the shell openings 105. FIG. 7 also illustrates the use of an external rotating brush 131 in the off-running wedge zone 52, with its bristles in contact with the shell outer surface, to sweep the fiber particles into the conveyor screw 51.

In some instances, which could depend on the thickness and permeability of the stock layer 106, and the tension pressure applied by the wire, it may be found advantageous to direct purging air in a generally radially outward direction, in the direction of the already present centrifugal force, so as to assist in water removal. Such an internal blow box 132 is also shown in FIG. 7. As in the case of the vacuum or suction box 110, the leading edge of which may have a wiper or doctor 111, for water film removal into a trough 113, as previously described.

Figure 8:
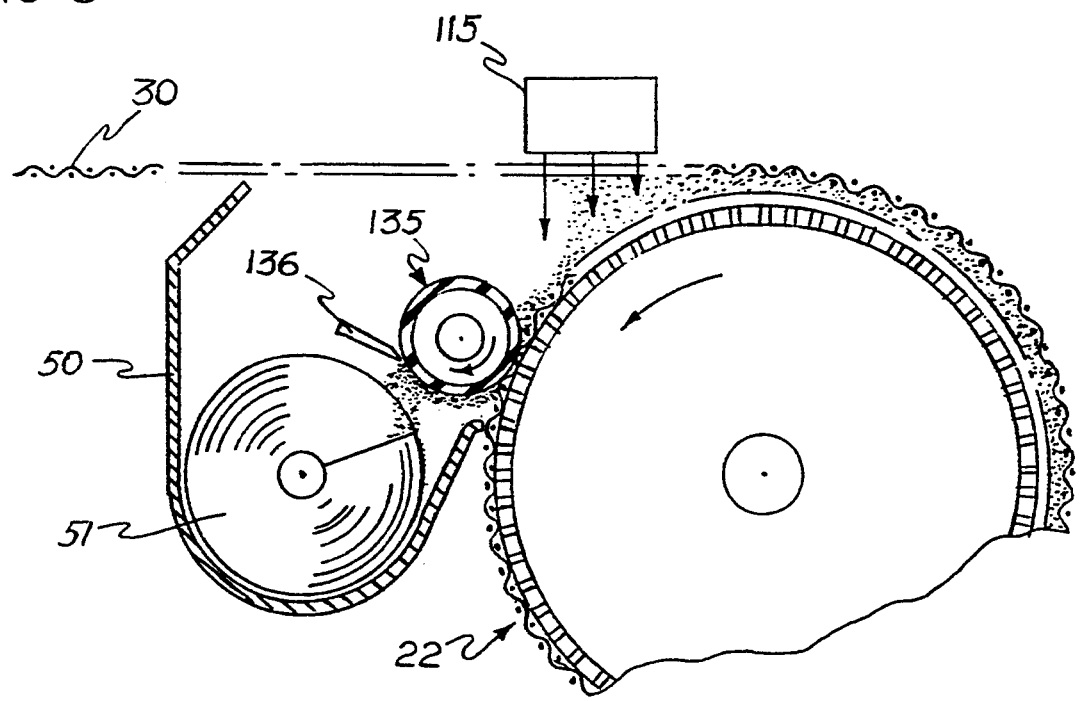
FIG. 8 is a view similar to FIG. 7 illustrating the use of a couch roll for removing the thickened mat from the surface of the second roll.

FIG. 8 illustrates another arrangement for removing the layer of thickened pulp from the second roll 22 which is particularly advantageous when the roll 22 has a discontinuous surface of any of the types discussed above. In FIG. 8, the roll 135 is of the type often employed as a couch roll with a thickener of the decker type and therefore has an outer surface, such a rubber covering, which is smoother than the surface of the roll 22. The positioning of the two rolls should be such that the roll 135 is in gentle pressure engagement with the mat of pulp on the surface of roll 22 so that this mat will transfer to the smoother surface of roll 135, from which it is removed by a doctor 136 into the trough 50.

Figure 9:
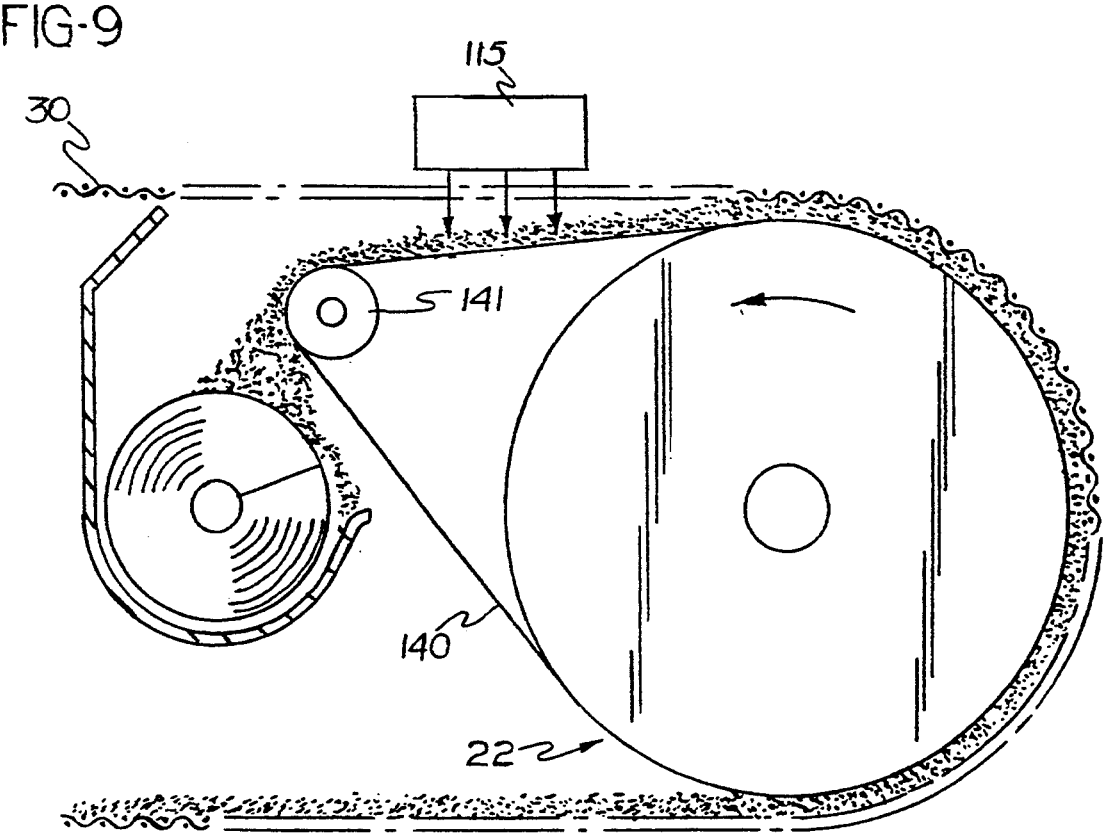
FIG. 9 is a view similar to FIG. 8 illustrating the use of an endless belt of string or open mesh for removing the thickened mat from the surface of the second roll.

FIG. 9 shows still another provision for transferring the thickened mat of pulp from the surface of roll 22 to the trough 50. In FIG. 9, a highly porous endless belt 140 composed, for example, of multiple parallel strings or a wide mesh woven fabric, wraps the roll 22 and a guide roll 141 of small diameter positioned above the trough 50. With this arrangement, the mat of pulp is compressed onto the belt 140 as it travels around the roll 22 and thus follows belt 140 away from roll 22 until it is removed by gravity into the trough 50. A doctor 142 may be positioned as shown to assure removal of all of the mat from belt 140, and it may also be desirable to provide a blow box 115 above the wire as described in connection with FIG. 7.

Figure 10:
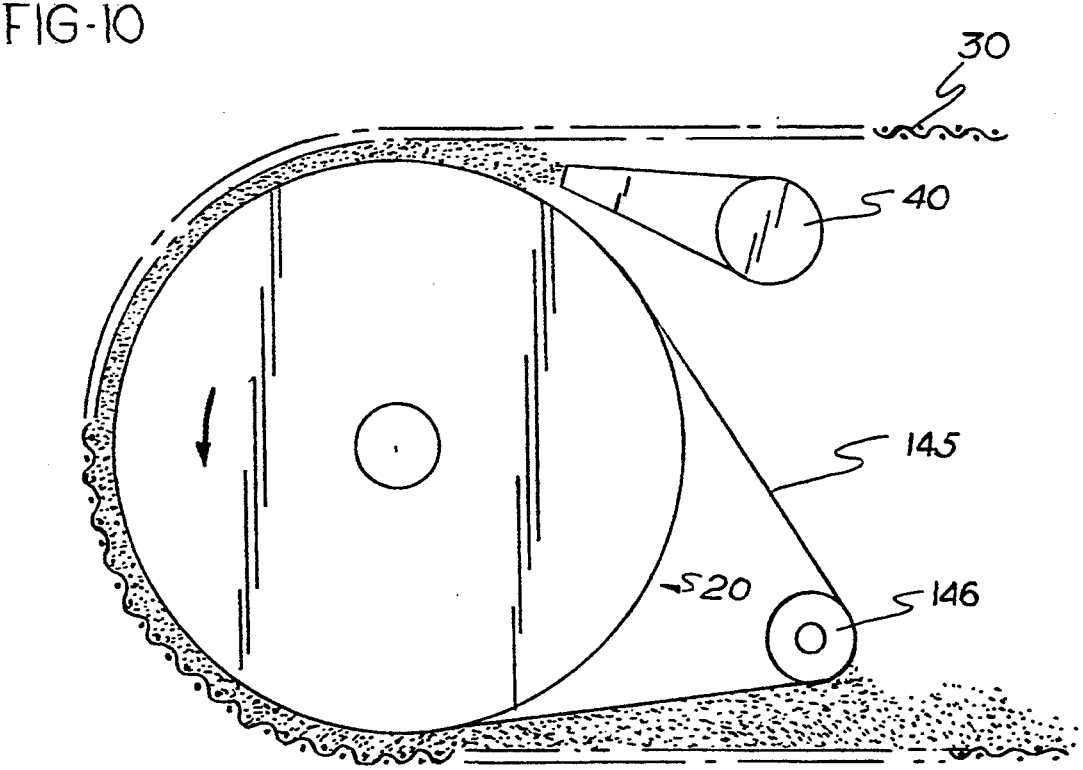
FIG. 10 is a fragmentary view illustrating the use of a belt of string or open mesh to assist in removing the thickened mat from the surface of the breast roll and laying it down on the wire for travel to the second roll.

FIG. 10 illustrates the use of a similar highly porous belt 145 in conjunction with the roll 20 for the purpose of assuring that all of the pulp mat thickened in passing around the roll 20 will be removed therefrom for travel on the inside of wire 30 to the second roll. As shown, the belt 145 wraps the roll 20 and a guide roll 146 of relatively small diameter so that as the belt 145 takes a sharp turn around roll 146, any thickened pulp which has not already dropped off should be dislodged and thrown forward and then down onto the inner surface of wire 30. A belt 140 or 145 may be used with either permeable or impervious rolls.

FIG. 11 illustrates the use of an air doctor 150 in a number of alternate positions for the removal of water from the wire openings or surface cavities. The nozzle 151 directs its stream of air at against the outer surface of the wire at a location adjacent the off-running side but before the end of the pressing zone. The optimum location of the nozzle 151 may depend on the geometry of the wire cavities and may require consideration of the velocity vector of the belt at the region of impingement.

The air stream from nozzle 150 overcomes the surface tension which otherwise retards the escape of the water. The removal of such crevice water reduces the rewetting which would otherwise occur when the pulp layer enters the wedge zone 52. The water removed by the air jet 150 enters the filtration space under the hood 67 and is drained by the trough 65 and outlet 66, as shown in FIG. 1. This air jet arrangement for the removal of water trapped in the wire may be used with either permeable or impervious rolls.

A further preferred arrangement for enhancing water removal is provided by a nip roll 155, as shown in FIG. 12. The nip roll 155. usually of a smaller diameter than that of the roll 100 or 22, applies a pressing force at the outer surface of the wire at the compression or squeeze zone. It is preferably located more than half way around the pressing zone, at a point where water removal is already partially accomplished at the second roll.

The nip roll 155 may have a smooth surface, or may have a more open surface with either axial or spiral grooves, for example, or with blind or through openings. It could also be a wire mesh covered roll. Where an air jet 150 is used, the nip roll 155 should be located before the air jet. If the nip roll is used in combination with a suction box 110 or a blow box 120, it would precede such device. The nip roll 155 compresses the pulp or fiber mat or layer 106 to a greater extent than is possible by wire tension alone.

In some instances, the openings in the second roll can be so large that a mechanical squeezing effect is not achieved, and the dewatering takes place principally though the action of centrifugal force. Such an arrangement may be preferred where the stock has suspended material which dewaters easily, or where higher consistency by squeezing is not required, so that the pulp layer is primarily or entirely supported by the wire belt 30.

Figure 13:
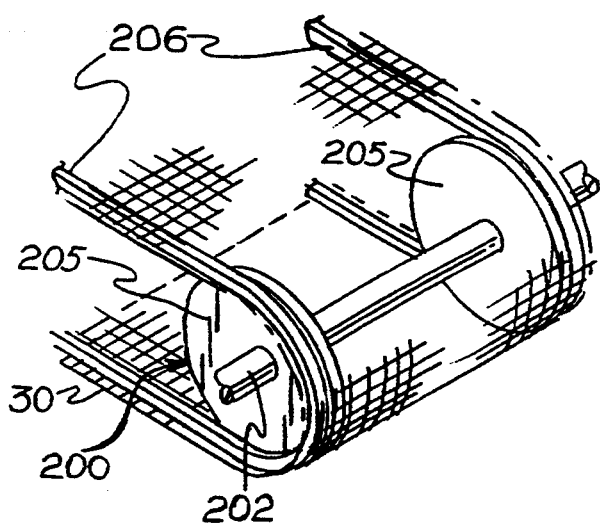
FIG. 13 is a diagrammatic perspective view of another embodiment of the apparatus in which the wire belt is guided over two or more shaft-mounted disks, to provide a maximum degree of openness.

Such an arrangement is illustrated by the open roll 200 in FIG. 13, which includes a support shaft 202 having a limited number of identical disks 205 of the same diameter mounted thereon. At a minimum, two of the disks 205 are provided, one at each end of the roll 200, and in effect define the roll. The wire belt 30 is supported and guided by the disks, and the pulp is applied to and carried by the inside surface of the belt, as previously described. As with the other embodiments, the belt itself and the action of the liquid and the pulp create tension to keep the belt tight, even in those regions where the belt is not supported by a roll, The roll 200 may be substituted for either or both of the rolls 20 or 22, and the aforedescribed headbox applicators and dewatering devices may be used.

It should be understood that in each of the embodiments described above, means should be provided for guiding the wire to travel in a path perpendicular to the axes of the two rolls on which it is supported, and preferred means for effecting such guiding are disclosed in the commonly owned application of Paul G. Marsh, Ser. No. 229,393, filed Aug. 8, 1988. Such means comprise a guide strip secured along one or both edges of the inner surface of the wire loop, and complementary grooves in the surfaces of the rolls, or a pair of guide strips at opposite edges of the belt which overhand the ends of the rolls wrapped by the wire as is shown diagrammatically at 206 in conjunction with the disks 205 at each end of roll 200 in FIG. 13.

Figure 14:
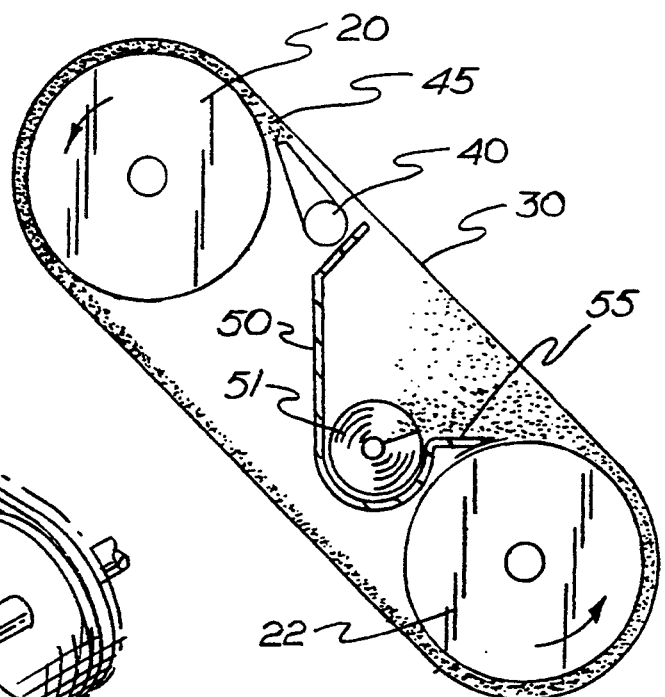
FIG. 14 is a diagrammatic view illustrating a form of the invention wherein the axes of the two rolls lie in a plane inclined to the horizontal, with the breast roll being at a higher level than the second roll.

FIGS. 14-19 show a variety of embodiments of the invention wherein the axes of the rolls 20 and 22 are not in the same horizontal plane. More specifically, the first or breast roll 20 in FIG. 14 is at a higher elevation than the second roll 22 such that their axes define a plane extending at approximately 45° to the horizontal. In FIG. 14, the two rolls and the wire travel in counterclockwise directions, and the headbox 40 is positioned to discharge the suspension to be thickened into the wedge zone 45 on the upper side of roll 20. The thickened stock is removed from roll 22 in the same manner as shown in FIG. 1, by means of a doctor 55 which directs the mat of pulp into the trough 50.

Figure 15:
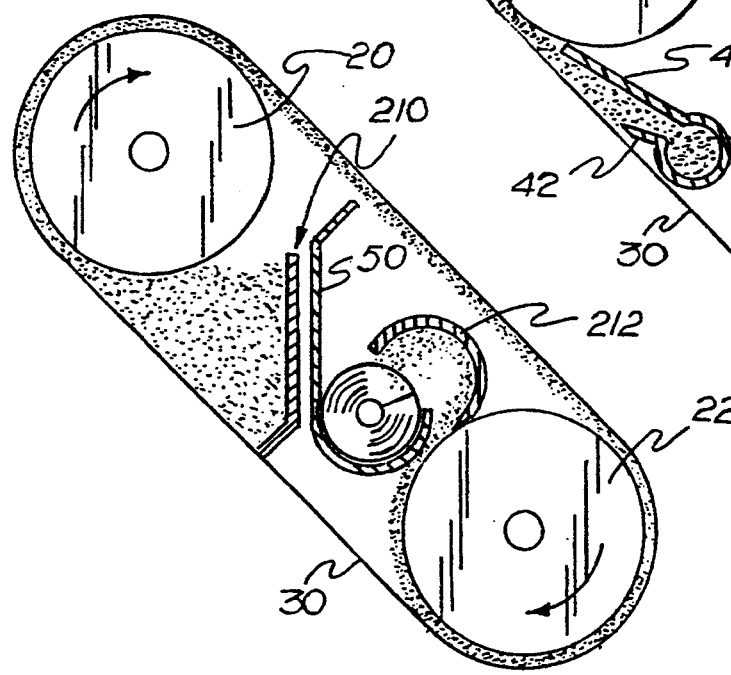
FIG. 15 is a view similar to FIG. 14 illustrating an alternative arrangement and incorporating a flooded nip type of headbox.

In FIG. 15, the arrangement of the rolls is the same as in FIG. 14, but the rolls and wire are shown as traveling clockwise in combination with an open-sided headbox 210 which is in effect an open-sided trough in that its side adjacent the wire is formed by the wire itself. With this feed arrangement, the wire and a lower portion of the roll 20 are flooded with suspension to be thickened, so that appreciable thickening takes place by drainage of liquid through the wire before the thickened suspension reaches the space between the wire and roll 20. The thickened pulp is removed from the surface roll 22 by a doctor 212 of curved configuration so that it directs the mat of pulp into a trough 50 as illustrated in FIG. 14.

Figure 16:
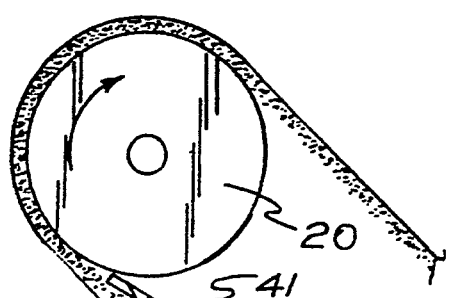
FIG. 16 is a fragmentary view similar to FIG. 15 and illustrating the use of a nozzle-type headbox.

FIG. 16 illustrates an alternative to FIG. 15 wherein the arrangement of wires is the same as in FIG. 15, but the headbox 215 is similar in structure and mode of operation to the headbox identified as 40 in FIG. 1 of U.S. Pat. No. 4,722,793, namely a pressure headbox having one side 42 shorter than its other side 41 so that it forces stock against the wire as well as into the wedge zone 45. The arrangement for removing the thickened pulp would be the same in the form shown in FIG. 16 as in FIG. 15.

Figure 17:
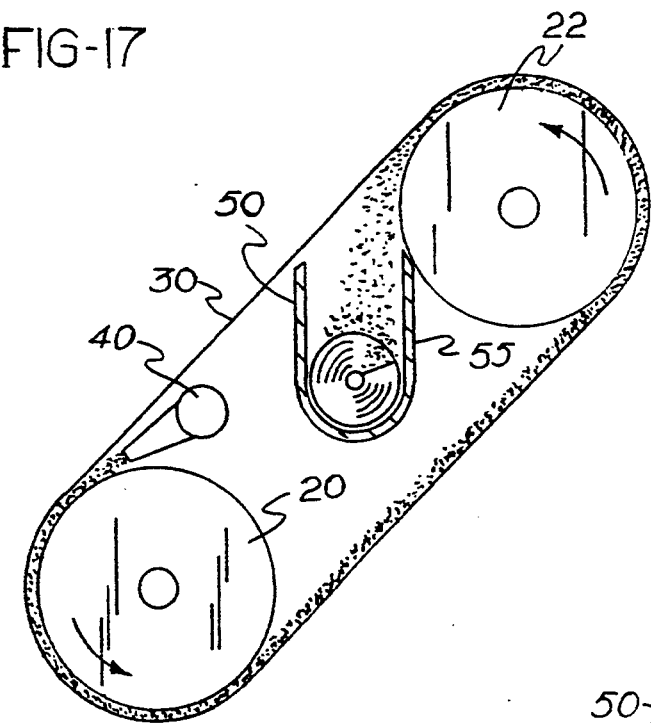
FIG. 17 is a view similar to FIG. 14 illustrating a form of the invention wherein the breast roll is at a level lower than the second roll.
Figure 18:
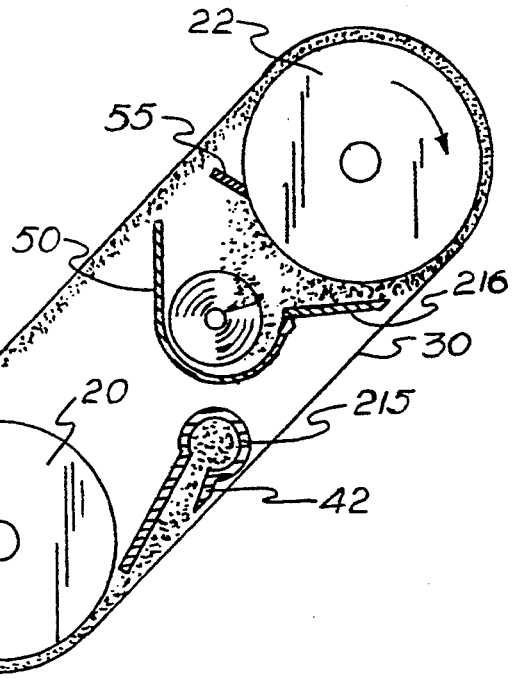
FIG. 18 is a view similar to FIG. 17 and showing an alternate arrangement.

FIGS. 17 and 18 show alternative arrangements similar to those in FIGS. 14 and 15 except that the positions of the rolls 20 and 22 are reversed, with the breast roll 20 in the lower position. In FIG. 17, the breast roll 20, second roll 22 and wire 30 travel counterclockwise, and the headbox 40 is positioned to discharge the suspension to be thickened into the wedge zone 45 as in FIG. 1. Similarly, the thickened pulp is removed from the roll 22 by a doctor 55 into the trough 50. A practical advantage of the arrangement of FIG. 17 over that in FIG. 1 is the reduction in floor space resulting from tilting of the apparatus as a whole.

In FIG. 18, the arrangement of the rolls is the same as in FIG. 17, but they and the wire travel clockwise. The headbox 215 may be of the nozzle type shown at 40 in FIGS. 1 and 14, but is shown as of the same construction as in FIG. 16 so that it discharges the suspension directly against the wire as well as into the wedge zone 45 on the downward side of roll 20.

The second roll 22 in FIG. 18 should preferably have surface characteristics such that the thickened mat of pulp will remain thereon rather than transferring to the wire in the wedge zone 52, and it would be desirable to provide a slide 216 in position, as shown, to convey the thickened pulp by gravity into the trough 50. Any thickened material which is not thrown off from roll 22 by centrifugal force may be removed and delivered to the trough 50 by a doctor 55. Note also that it is immaterial if some of the thickened pulp remains on the wire, since it will simply be mixed with fresh suspension in the wedge zone 45 and recirculated to roll 22.

Figure 19:
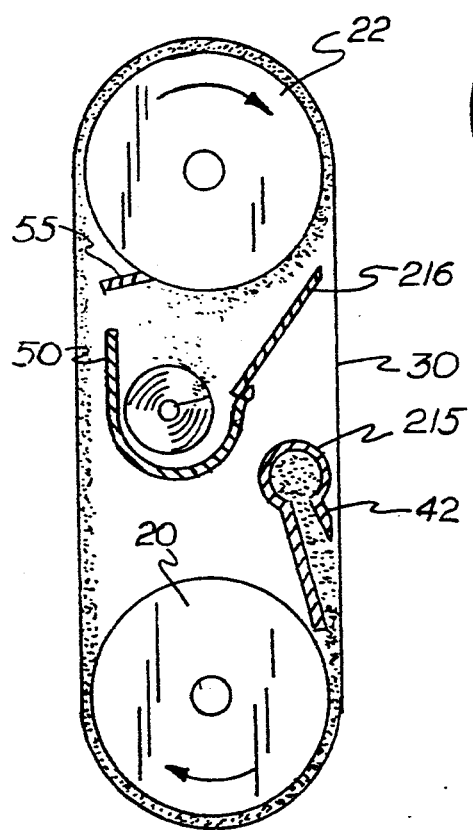
FIG. 19 is a diagrammatic view illustrating an embodiment of the invention wherein the two wire-supporting rolls are in vertically superimposed and spaced relation.
Figure 20:
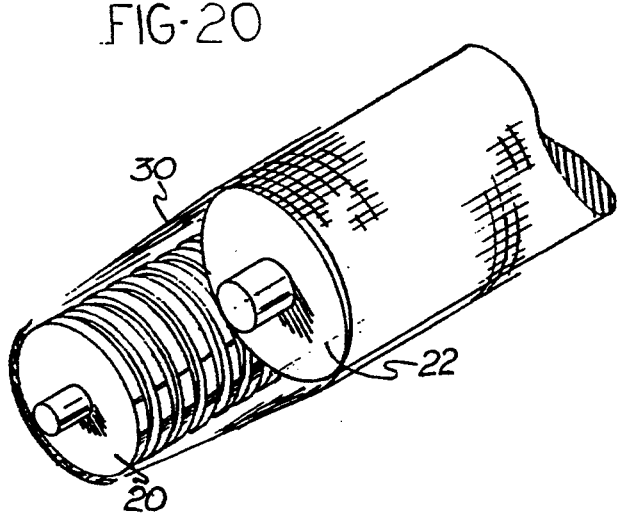
FIG. 20 is a diagrammatic view illustrating another embodiment wherein the axes of the two rolls are tilted in the cross machine direction.

FIG. 19 shows an embodiment of the invention which has the practical advantage of requiring minimum floor space, because the rolls 20 and 22 are mounted with their axes in the same vertical plane. In its other respects, the vertical orientation of the roll axes in FIG. 19 is comparable to the inclined orientation in FIG. 18, and the operations of these two forms of the invention are therefore closely comparable, whether the headbox 215 is of the same type as in FIG. 18, as shown, or of the nozzle type shown in other views. In either case, initial dewatering is essentially downward and is therefore easily handled by a save-all below the machine which will also receive the liquid collected by a hood enclosing the sides and top of the machine.

While in all of the embodiments shown in FIGS. 1-19 the rolls 20 and 22 are shown with their axes horizontal, the invention is not limited to such an arrangement. On the contrary, the axes of these rolls may be at any angle to the horizontal and there are practical advantages in having the two axes substantially parallel but at an angle to the horizontal in the cross machine direction. For example, if they are tilted to 45%, as illustrated diagrammatically in FIG. 18, the trough into which the pulp is discharged from the second roll will be similarly tilted, so that pulp will be sluiced out from the interior of the wire loop.

Figure 21:
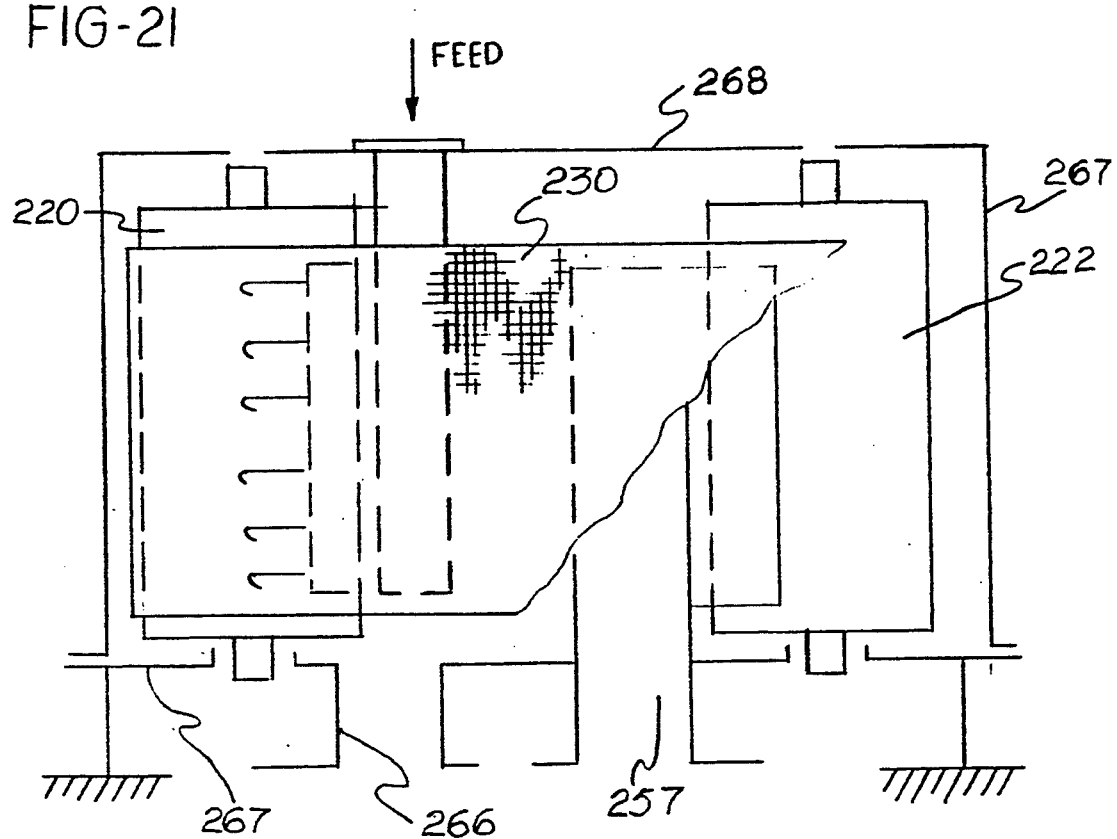
FIG. 21 is a diagrammatic view in side elevation, partly broken away, illustrating an embodiment wherein the two rolls are mounted with their axes vertical.
Figure 22:
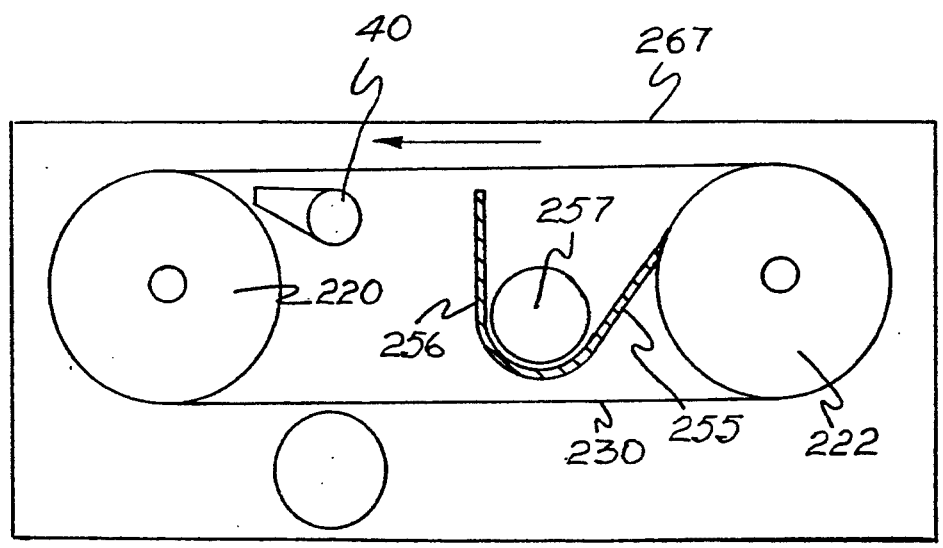
FIG. 22 is a plan view of the apparatus shown in FIG. 20 with the top wall removed.

In a further such modification, FIGS. 21–22 show a specific embodiment of the invention wherein the rolls 220 and 222 are mounted in laterally spaced relation with their axes vertical, which is an arrangement that is both advantageous and is made practical by reason of the high wire speeds at which the apparatus of the invention is capable of operating.

More specifically, with the headbox 40 positioned to discharge the feed suspension into the wedge zone 45 as a jet flow which extends vertically, the suspension is trapped between the wire 230 and roll 220 before it has opportunity for downward flow under the influence of gravity. Then when the thickened pulp emerges on the outrunning side of roll 220, the speed of the wire 230 and the centrifugal force effective on the pulp mat formed during travel around roll 220 will hold that mat firmly on the wire as it travels to roll 222, during which travel it will be subjected to further dewatering by the combined centrifugal and catenary forces.

As this thickened mat then travels around roll 222, it is again subjected to further dewatering by centrifugal force, so that it will emerge on the outrunning side of roll 222 at a consistency comparable to that of the paper web at the couch roll of a Fourdrinier paper machine. If the roll 222 is smooth and liquid-impervious, the mat will follow that roll surface away from the wire, and it can then be readily removed from the roll by any suitable doctor blade 255 that deflects it towards a suitably curved vertical wall 256 by which it is intercepted and guided downwardly to a pipe or chute 257 which leads to the next station in the system.

This arrangement for removing the thickened pulp from inside the loop of wire 230 is simple and effective, and it eliminates the need for a conveyor such as is shown in the other views. Similarly, the removal of the liquid expressed through the wire is simple and easy. A bottom wall 265 underlies all of the apparatus except for openings therethrough for the pulp outlet pipe 257 and the liquid outlet pipe 266, and the apparatus is also enclosed by side walls 267 and a top wall 268 which is removable to facilitate changing the wire 230. All of the liquid expressed through the wire 230 will therefore either fall first directly to bottom wall 265 or will bounce off the side walls 267 and thence to the bottom wall.

The apparatus shown in FIGS. 21–22 thus offers the same advantages as the forms of the invention shown in other views, and in addition it has the practical advantage that the wire can be changed from above without requiring cantilevering of rolls 220 and 222. It is also to be understood that any of the various roll constructions and combinations described above can be used as the rolls 220 and 222.

All of the forms of the invention shown in FIGS. 14–19 can advantageously include open-faced rolls as described above in connection with FIGS. 1–3 and 13, or one or both of the rolls 20 and 22 or 220 and 222 therein may be liquid-impervious as disclosed in U.S. Pat. No. 4,722,793 provided that the breast roll is grooved or otherwise indented. The choice of particular rolls for a given installation may be made in accordance with the teaching of that patent and of the foregoing description as applied by persons skilled in the art. In every case, suitable provision is needed for guiding the wire, as explained above in connection with FIG. 13.

Since the thickening apparatus of the invention was developed for use in the treatment of papermaking pulp or fiber suspensions, it has been described with specific reference thereto. It is to be understood, however, that the apparatus of the invention could be used to thicken other dilute liquid suspensions of solid particles, such for example as sludges and the like, and use of the term "pulp" herein is to be understood as applying to any such suspensions.

While the forms of apparatus herein described constitute preferred embodiments of the invention, it is to be understood that the invention is not limited to these precise forms of apparatus and that changes may be made therein without departing from the scope of the invention which is defined in the appended claims.

What is claimed is:

1. Apparatus for thickening a suspension of solid particles of predetermined maximum size in liquid, comprising:
   (a) means defining a frame,
   (b) first and second rolls rotatably mounted on substantially parallel axes in spaced relation in said frame,
   (c) an endless wire belt trained around said rolls in wrapping relation with a limited angular portion of the surfaces thereof and cooperating therewith to define a space enclosing said rolls and bounded by said wire belt to which the portion of each said roll surface not wrapped by said belt is exposed,
   (d) said first roll comprising means defining a discontinuous cylindrical outer surface having multiple openings therethrough and enclosing a chamber therewithin which is connected through said opening with said space and with the inner surface of the portion of said belt wrapping said roll,
   (e) said openings being of sufficiently greater individual flow area than said maximum particle size to provide for free flow of said suspension and all particles therein through said surface into and out of said chamber,
   (f) headbox means mounted in said space and having an outlet positioned to discharge a continuous flow of said suspension toward the wedge zone defined by said exposed surface portion of said first roll and the portion of said belt approaching said surface and thereby to cause at least some of said suspension to enter said chamber through said openings in said exposed portion of said discontinuous surface,
   (g) means for driving said wire belt and rolls at a surface speed effecting the development of centrifugal force causing said suspension within said chamber to be discharged outwardly from said chamber through said openings and the liquid component thereof to be expressed through the portion of said belt wrapping said surface while said solid particles in said suspension retained by said belt form a mat of pulp on the inner surface of said belt which is further thickened by the expression of additional liquid in traveling with said belt around said second roll,
   (h) means associated with said second roll for causing said deposited pulp to transfer from said wire to said exposed portion of the surface of said second roll as said wire departs therefrom, and (i) means in said space for collecting the resulting pulp mat from said exposed surfaces of said second roll and removing said pulp from within said space.

2. Thickening apparatus as defined in claim 1 wherein said first roll includes a cylindrical shell defined by substantially radial walls which are relatively spaced circumferentially of said shell to define said openings and which are of sufficient radial extent to impel liquid within said openings at substantially the same linear speed as said belt.

3. Thickening apparatus as defined in claim 1 wherein said openings in said first roll outer surface are of sufficiently greater individual flow area than paper making fibers to provide for free flow of a suspension of paper making fibers through said surface into and out of said chamber.

4. An apparatus for thickening a suspension of solid particles of predetermined maximum size in liquid, in which said suspension is supplied to the inside surface of a moving endless wire belt loop wrapping a limited portion of the surface of a roll for the centrifugal extraction of liquid therefrom through said belt and resulting formation of a layer of pulp on said belt inside surface, the improvement comprising:
 (a) said roll having a generally cylindrical shell enclosing a chamber,
 (b) said shell comprising means defining multiple openings through which said suspension may flow into and out of said chamber,
 (c) said openings being of sufficiently greater individual flow area than said maximum particle size to provide for free flow of said suspension and all particles therein both into and out of said chamber, and
 (d) headbox means positioned to supply said suspension to said chamber for discharge outwardly therefrom through said shell openings and into engagement with said belt inside surface,
 (e) said headbox means being positioned exteriorly of said shell and within said belt loop to direct said suspension into the wedge zone between said roll and belt at the on-running side of said roll so that at least a portion of said suspension enters said shell chamber through said openings in a portion of said shell which is not wrapped by said belt and exits said chamber through a portion of said shell which is wrapped by said belt.

5. Thickening apparatus as defined in claim 4 wherein said roll comprises a support shaft, a plurality of disks of the same diameter mounted on said shaft and including one thereof adjacent each end of said shaft, adjacent said disks being spaced from each other axially of said shaft to provide an open space therebetween, said belt being trained around a limited portion of the peripheries of said disks to enclose a corresponding portion of each said open space between adjacent disks while leaving the remainder of each of said spaces exposed, and said headbox means being positioned to direct said suspension into said exposed spaces.

6. Thickening apparatus as defined in claim 4 wherein said openings in said first roll outer surface are of sufficiently greater individual flow area than paper making fibers to provide for free flow of a suspension of paper making fibers through said surface into and out of said chamber.

* * * * *